US009628769B2

(12) United States Patent
Horlander

(10) Patent No.: US 9,628,769 B2
(45) Date of Patent: Apr. 18, 2017

(54) APPARATUS AND METHOD FOR GENERATING A DISPARITY MAP IN A RECEIVING DEVICE

(75) Inventor: Thomas Edward Horlander, Indianapolis, IN (US)

(73) Assignee: Thomson Licensing DTV, Issy les Moulineaux (FR)

(*) Notice: Subject to any disclaimer, the term of this patent is extended or adjusted under 35 U.S.C. 154(b) by 567 days.

(21) Appl. No.: 13/985,365

(22) PCT Filed: Feb. 15, 2011

(86) PCT No.: PCT/US2011/024877
§ 371 (c)(1),
(2), (4) Date: Aug. 14, 2013

(87) PCT Pub. No.: WO2012/112142
PCT Pub. Date: Aug. 23, 2012

(65) Prior Publication Data
US 2013/0322544 A1 Dec. 5, 2013

(51) Int. Cl.
H04N 13/00 (2006.01)
H04N 13/04 (2006.01)
H04N 19/597 (2014.01)

(52) U.S. Cl.
CPC ..... H04N 13/0022 (2013.01); H04N 13/0048 (2013.01); H04N 13/0497 (2013.01); H04N 19/597 (2014.11)

(58) Field of Classification Search
CPC .................................................. H04N 13/0022
(Continued)

(56) References Cited

U.S. PATENT DOCUMENTS 5,612,735 A * 3/1997 Haskell .............. H04N 13/0048
348/43
6,043,838 A * 3/2000 Chen ..................... G06T 7/0022
348/42

(Continued)

FOREIGN PATENT DOCUMENTS

CN 1925628 3/2007
EP 0915433 A2 5/1999

(Continued)

OTHER PUBLICATIONS

Moshen Ashourian, "A Video Multiplexing Scheme Using Data Embedding," Dept. of Information Technology, IEEE.org.

(Continued)

Primary Examiner — Dave Czekaj
Assistant Examiner — Shanika Brumfield
(74) Attorney, Agent, or Firm — Brian J. Dorini; Michael A. Pugel

(57) ABSTRACT

An apparatus and method for generating a disparity map in a receiving device, e.g., a set-top box, that enables user control for adjusting image depth in a stereo image set are provided. The apparatus and method provide for receiving a signal comprising a left eye image and a right eye image, encoding the left eye image as a reference image, predictively coding the right eye image using the coded left eye image as the reference image, capturing motion indicators generated during encoding of the right eye image, and generating a disparity map between the left eye image and right eye image using the motion indicators.

28 Claims, 9 Drawing Sheets

(58) Field of Classification Search
USPC .................. 375/240.02–240.2; 348/42–60
See application file for complete search history.

(56) References Cited

U.S. PATENT DOCUMENTS

| | | | |
|---|---|---|---|
| 6,314,211 B1 | 11/2001 | Kim et al. | |
| 6,522,339 B1 | 2/2003 | Orimo | |
| 7,420,559 B2 | 9/2008 | Kokojima et al. | |
| 7,742,046 B2 | 6/2010 | Fukushima et al. | |
| 8,730,303 B2 * | 5/2014 | Suh | H04N 13/0048 348/43 |
| 8,854,427 B2 | 10/2014 | Bruls et al. | |
| 2003/0095177 A1 | 5/2003 | Yun et al. | |
| 2004/0189875 A1 | 9/2004 | Zhai et al. | |
| 2006/0013490 A1 | 1/2006 | Sun | |
| 2007/0002041 A1 * | 1/2007 | Kim | H04N 9/8205 345/419 |
| 2008/0080049 A1 | 4/2008 | Hamagishi et al. | |
| 2008/0198920 A1 * | 8/2008 | Yang | H04N 13/0018 375/240.01 |
| 2008/0240549 A1 | 10/2008 | Koo et al. | |
| 2008/0303895 A1 | 12/2008 | Akka et al. | |
| 2010/0177162 A1 | 7/2010 | Macfarlane | |
| 2010/0182402 A1 * | 7/2010 | Nakajima | G09G 5/006 348/42 |

FOREIGN PATENT DOCUMENTS

| | | | |
|---|---|---|---|
| EP | 1739979 | 1/2007 | |
| EP | 1983765 A1 | 10/2008 | |
| JP | 2006121553 A | 5/2006 | |
| JP | 2008107763 | 5/2008 | |
| JP | 2010028261 | 2/2010 | |
| KR | 2004065014 | 7/2004 | |
| WO | WO2009045032 | 4/2009 | |
| WO | WO 2009045032 A1 * | 4/2009 | .......... H04N 19/597 |
| WO | WO2009091383 | 7/2009 | |
| WO | WO 2011163603 A1 * | 12/2011 | .......... G06T 7/0022 |

OTHER PUBLICATIONS

Chao-Chung Cheng, et al., "Hybrid Depth Cuesing for 2D-3D Conversion System," National Taiwan University.
Ianir Ideses, "Real-Time Depth Map Manipulation for 3D Visualization," Department of Industrial Engineering.
Man-Bae Kim, et. al., "Stereoscopic Converstion of Monoscopic Video by the Transformation of Vertical-To-Horizontal Disparity," Samsung Advanced Institute of Technology Suwon Korea.
Brust et al., "Mixed Resolution Coding with Inter View Prediction for Mobile 3DTV," Authors with Fraunhofer Institute for Telecommunications and Technical University of Berlin, Germany, 2010 IEEE, 4 pages.

* cited by examiner

APPARATUS AND METHOD FOR GENERATING A DISPARITY MAP IN A RECEIVING DEVICE

This application claims the benefit, under 35 U.S.C. §365 of International Application PCT/US2011/024877, filed Feb. 15, 2011, which was published in accordance with PCT Article 21(2) on Aug. 23, 2012 in English.

BACKGROUND OF THE INVENTION

Home entertainment systems, including television (TV) and media centers, are converging with the Internet and providing access to a large number of available sources of content, such as video, movies, TV programs, music, etc. As a result, numerous challenges have emerged related to the display and navigating process for that accessible content.

Broadcasters, eager to test the three dimensional (3D) display to the home video market, want to adopt a broadcast format that is backward compatible with all existing high definition (HD) capable set-top boxes in the field. The broadcasters have recently chosen to begin 3D video broadcasts with a half horizontal resolution split-screen encoding of the left and right stereo video views. In this scenario, as well as other split-screen video scenarios, it is the display device that converts from the split-screen format to a format that can be perceived as stereo video by the viewer.

The Blu-ray Disc Association (BDA) has elected the multi-view compression algorithm, also known as Multiview Video Coding (MVC), to support efficient compression of stereo video stored on 3D enabled Blu-ray discs. The BDA has also specified that 3D video be encoded with 1280×720 p60 or 1920×1080 p24 resolution and frame rate available for each eye. Current and previous generation set-top boxes are not capable of supporting the decoding of MVC coded video, and are also not capable of supporting any other known method that would deliver a video stream of equivalent resolution and frame rate as mandated by the BDA. As a result, broadcasters will be pushed to show an upgrade path to Blu-ray quality 3D video in the future. However, broadcasters will also be obligated to continue support of the initial group of 3D video customers using legacy decoders and half horizontal resolution split-screen video. This obligation rules out a switch to MVC compression unless the broadcaster is willing to pay for an equipment swap to upgrade the decoders used by the initial 3D customers.

Further, with the advent of the delivery of 3D video to the home, the ability to display the 3D content properly in a home environment. One particular problem is related to the ability to adjust the depth of field of the 3D content while viewing. A user may not feel comfortable watching the 3D content on a smaller display device and the user experience of 3D may, as a result, not be enjoyable. Other similar problems related to depth of field or other aspects of the 3D content may also be present. A user would benefit from the ability to make adjustments to the 3D content prior to, or during, viewing. In order for the user to perform these adjustments additional information, such as the disparity mapping for the content, are needed. However, in most cases, this additional information is not available or provided as part of the 3D content delivery.

Therefore, there is a need to generate information, such as the disparity mapping, for the delivered 3D content in the home environment in order to allow a user to adjust parameters related to the viewing of the 3D content, such as depth of field.

SUMMARY

According to one aspect of the present disclosure, a method is provided including the steps of receiving a signal comprising a left eye image and a right eye image, encoding the left eye image as a reference image, predictively coding the right eye image using the coded left eye image as the reference image, capturing motion indicators generated during encoding of the right eye image, and generating a disparity map between the left eye image and right eye image using the motion indicators.

According to another aspect of the present disclosure, an apparatus is provided including a receiver that receives a signal comprising a left eye image and a right eye image; an encoder that encodes the left eye image as a reference image, the encoder predictively codes the right eye image using the coded left eye image as the reference image and captures motion indicators generated during encoding of the right eye image, and a controller that generates a disparity map between the left eye image and right eye image using the motion indicators.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
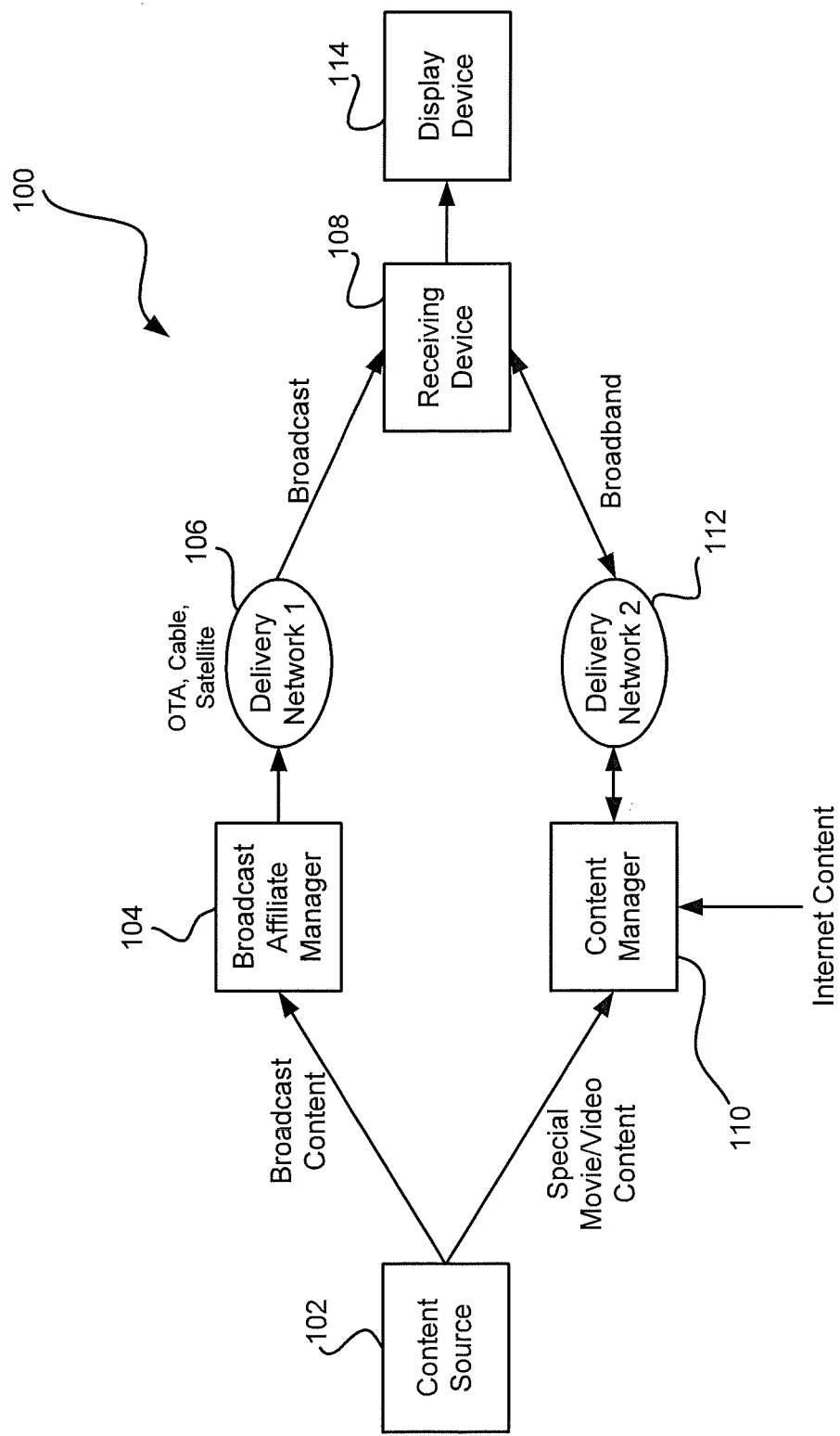
FIG. 1 is a block diagram of an exemplary embodiment of a system for delivering video content in accordance with the present disclosure.

It should be understood that the drawings are for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure relates to systems and methods for permitting the broadcast and reception of three dimensional (3D) video content along with two dimensional (2D) content to service several different reception conditions, including receiving and decoding only a 2-D image, receiving and decoding only a single video frame containing both left and right view images at a reduced resolution, and receiving and decoding both signals together in order to display an improved resolution 3-D image. The systems and methods indicate transmitting, for instance, the left view image at full resolution along with a second signal having both the left and right view images combined at a reduced (i.e. half) resolution. The receiver may decode one or the other signal and may alternatively decode both if it has the capability. If the receiver decodes both, it may also sample rate upconvert, for instance, the reduced resolution right eye view to match the image size of the decoded full resolution left view signal.

Initially, systems for delivering various types of video content to a user will be described. Turning now to FIG. 1, a block diagram of an embodiment of a system 100 for delivering content to a home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a receiving device 108 in a user's home, where the content will subsequently be searched by the user. It is to be appreciated that the receiving device 108 can take many forms and may be embodied as a set top box/digital video recorder (DVR), a gateway, a modem, etc.

A second form of content is referred to as special content. Special content may include content delivered as premium viewing, pay-per-view, or other content otherwise not provided to the broadcast affiliate manager, e.g., movies, video games or other video elements. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system. The content manager 110 may deliver the content to the user's receiving device 108 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of Delivery network 1 (106). In addition, the user may also obtain content directly from the Internet via delivery network 2 (112) without necessarily having the content managed by the content manager 110.

Several adaptations for utilizing the separately delivered content may be possible. In one possible approach, the special content is provided as an augmentation to the broadcast content, such as providing alternative displays, purchase and merchandising options, enhancement material, and similar items. In another embodiment, the special content may completely replace some programming content provided as broadcast content. Finally, the special content may be completely separate from the broadcast content, and may simply be a media alternative that the user may choose to utilize. For instance, the special content may be a library of movies that are not yet available as broadcast content.

Figure 2:
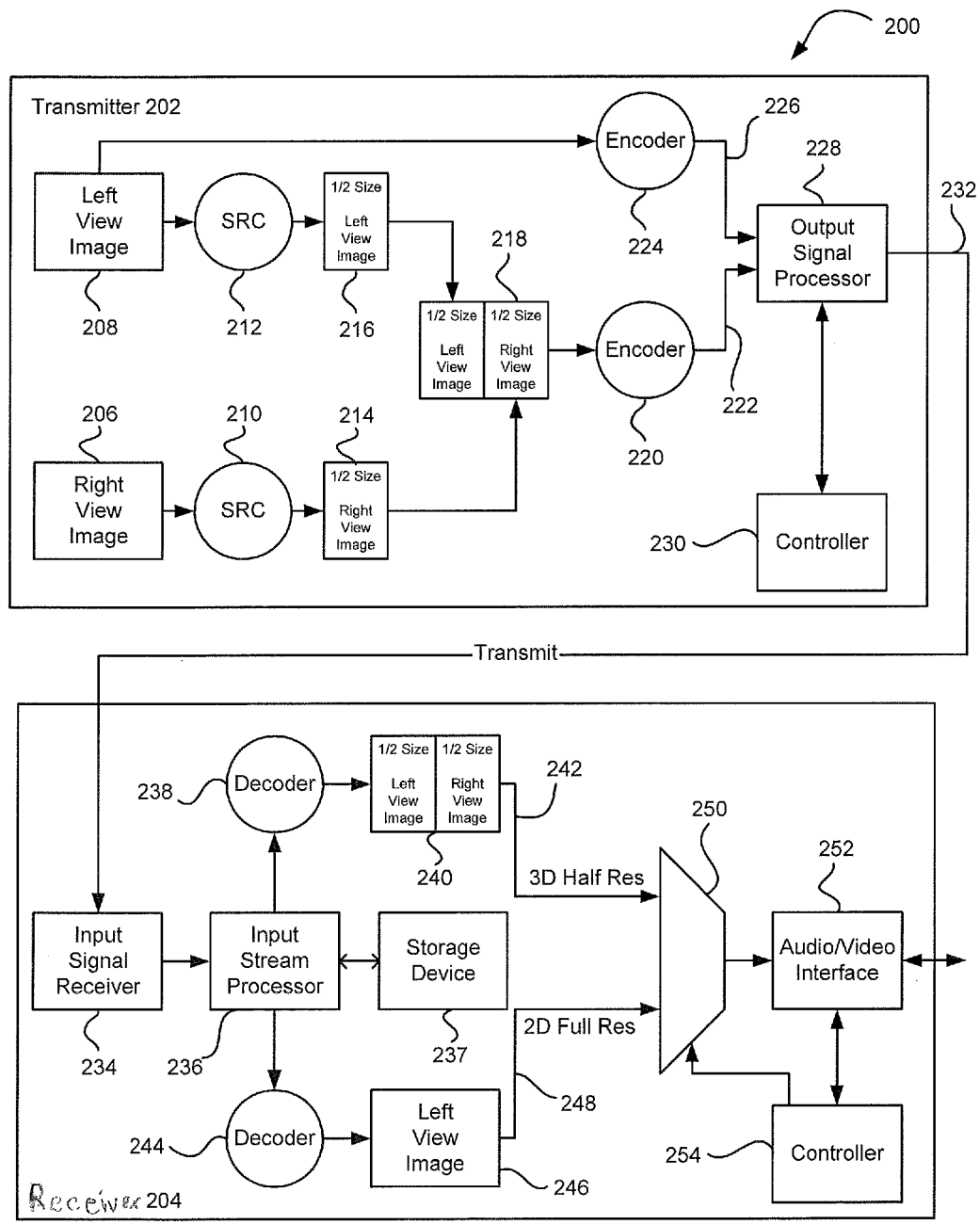
FIG. 2 is a block diagram of an exemplary embodiment of a system for three dimensional (3D) half resolution split screen broadcasts which provides two dimensional (2D) legacy support in accordance with the present disclosure.

Referring to FIG. 2, a block diagram of an embodiment of a system 200 for three dimensional (3D) half resolution split screen broadcasts which also provides two dimensional (2D) legacy support is shown. System 200 includes a transmitter 202 for encoding and broadcasting video content and a receiver 204 for receiving the video content, decoding the video content and providing the decoded video content to a display device. Transmitter 202 may typically be included with equipment located at a signal transmission center, such as broadcast affiliate manager 104 described in FIG. 1. The signal produced by transmitter 202 is transmitted over a broadcast network, such as delivery network 1 (106) to receiver 204. Receiver 204 may be a set top box, gateway, computer, or other network interface device that is typically located at or near a user's home. Receiver 204 may also be included in a mobile device, such as a personal digital assistant, tablet, or cellular telephone.

The transmitter 202 includes a source for, or otherwise acquires, a full resolution, right view image 206 and a full resolution left view image 208 of a stereo image pair. The right view image 206 and left view image 208 may be provided from a content source, such as content source 102 described in FIG. 1. Each of the right view image 206 and left view image 208 are passed to respective sample rate converters 210, 212. Sample rate converters 210, 212 convert the horizontal sample rate of each image to one half the original horizontal size. The one half size right view image 214 and one half size left view 216 are merged into a single image in an image processor 218.

The merged image from image processor 218 is then transmitted to encoder 220 where the merged image is encoded in accordance with the Motion Picture Entertainment Groups (MPEG) H.264/MPEG-4 Part 10 standard, the Advanced Video Coding (AVC) standard, or similar compression algorithm, to create first bit stream 222. Additionally, the acquired full resolution left view image 208 is provided to encoder 224 where the left view image 208 is encoded in accordance with H.264/MPEG-4 Part 10, AVC, or similar compression algorithm, to create a second bit stream 226. It is important to note that the two streams may not use the identical compression algorithms. For instance, encoder 220 may encode the first bit stream 222 using a higher or lower compression rate H.264 algorithm than encoder 224 uses for the second bit stream 226. Additionally, although the full resolution image 208 is identified as a left view image, its description is for convention purposes only. The full resolution image 208 may, instead be identified as aright view image. As a result, it is understood that the descriptions for left view image and right view image signal throughout this disclosure may be reversed.

The first and second bit streams 222, 226 from encoder 238 and encoder 244 are provided to output signal processor 228. Controller 230 creates of determines identification information and provides this information along with any other control information to output signal processor 228. In one embodiment, controller 230 sets a packet ID for each bit stream. Output signal processor 228 merges the first and second bit streams 222, 226 into a single bit stream 232 for transmission as part of a signal to the receiving device 204 based on the packet ID information and the control information provided by controller 230. Controller 230 also appends additional information to the single bit stream 232 including, but not limited to, an identification bit, an identification byte, or identification packet. Furthermore, the controller 230 may create a program guide that is also transmitted as part of the signal to the receiving device using the identification. The inclusion of program guide information allows the receiver 204 to identify the program content that the bit stream 232 contains.

The receiver 204 processes the incoming signal including bit steam 232, and provides a separation of the content based on the program guide. The receiver 204 may include a storage device 237, such as a hard drive or optical disk drive, for recording and playing back audio and video content. The processed content is provided to a display device, such as display device 114 described in FIG. 1. The display device may be a conventional 2-D type display or may alternatively be an advanced 3-D display. The receiving device 204 may also be incorporated into other systems including the display device itself. In either case, several components necessary for complete operation of the system are not shown in the interest of conciseness, as they are well known to those skilled in the art.

In the receiving device 204 a signal including content, such as bit stream 232, is received in an input signal receiver 234. The input signal receiver 234 may be one of several known receiver circuits used for receiving, demodulation, and decoding signals provided over one of the several possible networks including over the air, cable, satellite, Ethernet, fiber and phone line networks. The desired input signal may be selected and retrieved in the input signal receiver 234 based on user input provided through a control interface (not shown). The output signal from the input signal receiver 234 is provided to an input stream processor 236. The input stream processor 236 performs the signal selection and processing, and determines which of the first and second bit streams are to be sent to the proper decoder. The input stream processor 236 will distinguish the first and second bit streams based on the program guide sent by device 202 and the packet ID or other identification information for each bit stream (e.g., bit stream 222 and bit stream 226).

Additionally, the input stream processor 236 may send the received bit streams to storage device 237. The storage device 237 allows later retrieval and playback of the content under the control of a controller 254 and also based on commands, e.g., navigation instructions such as fast-forward (FF) and rewind (Rew), received from a user interface (not shown). The storage device 237 may be a hard disk drive, one or more large capacity integrated electronic memories, such as static random access memory, or dynamic random access memory, or may be an interchangeable optical disk storage system such as a compact disk drive or digital video disk drive.

As described, the input stream processor 236 will separate the bit streams and forward one of the first and second bit streams to the appropriate decoder, either decoder 238 or decoder 244. In one embodiment, if the input stream processor 236 determines that the bit stream includes the merged image, the bit stream will be sent to decoder 238. Decoder 238 decodes the merged image in accordance with one or more video compression decoding algorithms, such as H.264/MPEG-4 Part 10 or AVC, to a merged image 240 having a half resolution left and right view. The 3D half resolution output 242 is provided to selector 250. Controller 254 is used to determine and control which of the bit streams is provided through selector 250 to audio/video interface 252. The operation of the selector 250 and controller 254 will be described below.

If the input stream processor 236 determines that the bit stream includes the full resolution left view image 208, the bit stream will be sent to decoder 244. Decoder 244 decodes the left view image 208 in accordance with one or more compression decoding algorithms to generate a left view image 246. The left view image is then outputted as a 2D full resolution output signal 248. The 2D full resolution output signal 248 is also provided to the selector 250.

Controller 254 determines a type of a display device coupled to the receiving device 204 via an audio/video interface 252. The audio/video interface 252 may be an analog signal interface such as red-green-blue (RGB) or may be a digital interface such as high definition multimedia interface (HDMI). The controller 254 communicates with the audio/video interface 252 and receives information from the audio/video interface 252 as to whether a 2D or 3D display device is connected thereto. For example, in the case of HDMI, the controller 254 determines the capabilities of the display device by communicating through the HDMI interface with the display device. However, this is generally not possible with an analog audio/video (A/V) interface. When connected by an analog AV interface, the display device setup is normally accomplished with buttons on the receiving device 204 which can be read by the controller, or with user interface screens where a user inputs the display type with a remote control driven selection.

Based on the type of the display device, the controller 254 controls the selector 250 to output the appropriate output signal, either the 3D half resolution video signal or 2D full resolution video signal. For example, if the controller 254 determines a 3D display device is coupled to the audio/video interface 252, the 3D half resolution output 242 will be sent to the audio/video interface 252 via the selector 250. If the controller 254 determines a 2D display device is coupled to the audio/video interface 252, the 2D full resolution output 248 will be sent to the audio/video interface 252 via the selector 250. It is to be appreciated that the above processing may originate from the signals received at the input signal receiver or from content retrieved from the storage device 237.

It is further to be appreciated that controller 230 and controller 254 may be interconnected via a bus to several of the components contained within transmitter 202 and set-top box 204 respectively. For example, controller 254 may manage the conversion process for converting the input stream signal into a signal for storage on the storage device 237 or for display on a display device, not shown. The controller 254 also manages the retrieval and playback of stored content. The controller 230 and controller 254 may further be coupled to a control memory, not shown, (e.g., volatile or non-volatile memory, including random access memory, static RAM, dynamic RAM, read only memory, programmable ROM, flash memory, EPROM, EEPROM, etc.) for storing information and instruction code for controller 230 and controller 254. Further, the implementation of the memory may include several possible embodiments, such as a single memory device or, alternatively, more than one memory circuit connected together to form a shared or common memory. Still further, the memory may be included with other circuitry, such as portions of bus communications circuitry, in a larger circuit.

Figure 3:
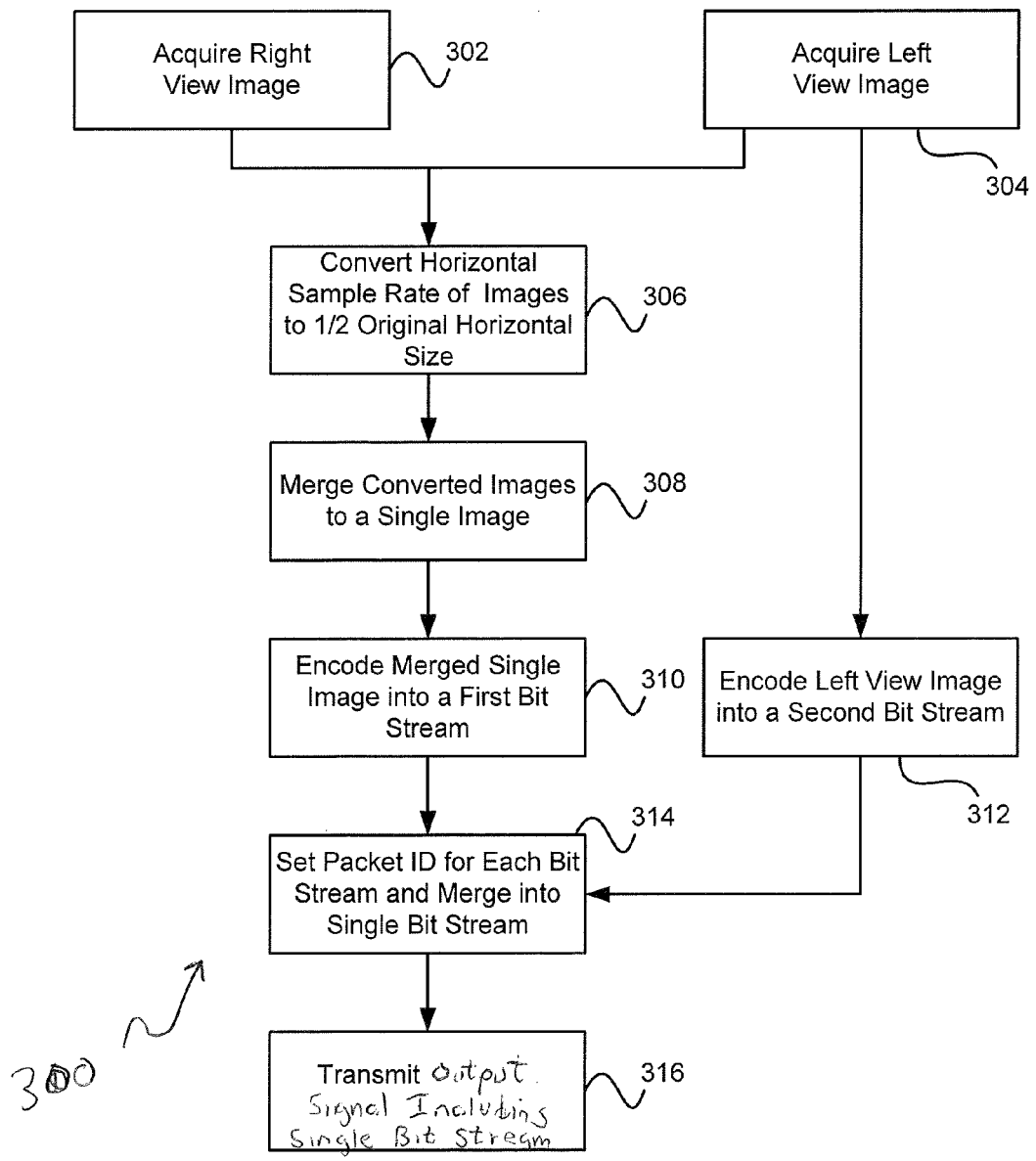
FIG. 3 is a flowchart of an exemplary embodiment of a process for encoding half resolution split screen broadcasts in accordance with the present disclosure.

Turning to FIG. 3, a flowchart of an embodiment of a process 300 for encoding half resolution split screen broadcasts is shown. Process 300 will primarily be described with respect to the transmitter 202 described in FIG. 2 but may similarly be included in the equipment found in broadcast affiliate manager 104 described in FIG. 1. At step 302, a full resolution, right view image is acquired. Similarly, at step 304 a full resolution left view image is acquired. The right view and left view image form a stereo image pair and may be provided from a content source, such as content source 102 described in FIG. 1. Additionally one of the two images may be generated by a transmitter device, such as transmitter 202, using a 2D image and 2D-3D processing techniques. At step 306, each of the right view image and left view image are converted by changing the horizontal sample rate of each image to one half the original horizontal size. Next, at step 308, the one half size right view image and one half size left view are merged into a single image. It is important to note that each one half size image typically occupies one half of the full horizontal width of the image signal. Alternatively, each half size image may be interspersed in a pattern across the entire image signal, such as in a checkerboard pattern.

At step 310, the merged image is then encoded using a video compression encoding algorithm to create a first encoded bit stream. In one embodiment, the merged image may be encoded in accordance with H.264/MPEG-4 Part 10, AVC, or some similar compression algorithm. At step 312, the full resolution left view image from step 304 is encoded using a video compression encoding algorithm, similar to that described in step 310, to create a second encoded bit stream.

Next at step 314, information about the first bit stream and second bit stream is retrieved and processed to form one or segments (e.g., bits, bytes, packets) of program information. Also in step 314, the first bit stream and second bit stream are merged to form a single signal or bit stream and the information for the first bit stream and second bit stream is appended to the single bit stream. In one embodiment the information is appended as a program identification (PID). The PID for the single bit stream may also be combined with PIDs from other bit streams to form a separate program guide bit stream. Last, at step 316, an output signal containing the single bit stream is transmitted. The output signal may be transmitted as a transmission signal over a delivery network, such as delivery network 106 described in FIG. 1. The transmission step 316 may also include additional signal processing necessary to transmit the signal, such as additional error correction encoding, modulation coding, digital to analog conversion, filtering, and upconverting of the analog signal. The output signal may contain other bit streams as well as additional information, such as a program guide stream. It is important to note that the program guide information may be appended to the single bit stream instead of being created as a separate bit stream.

Figure 4:
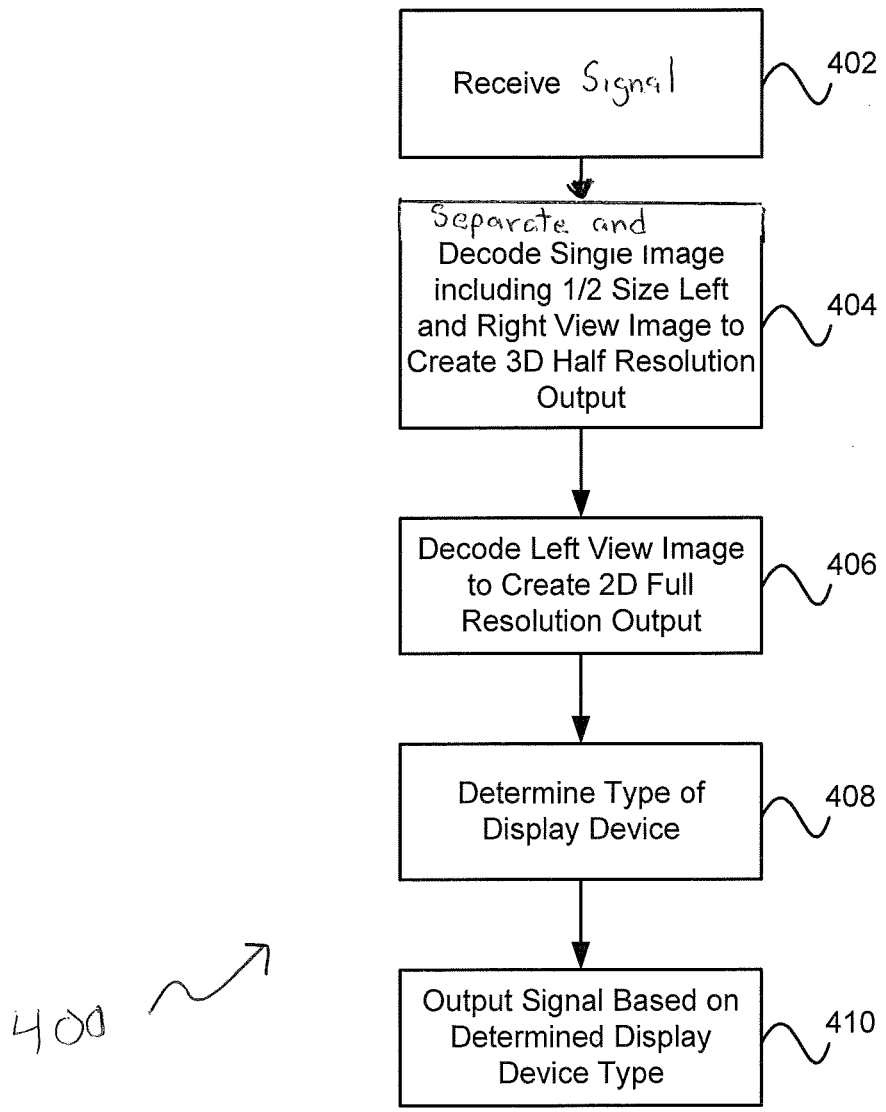
FIG. 4 is a flowchart of an exemplary embodiment of a process for decoding half resolution split screen broadcasts in accordance with the present disclosure.

Turning to FIG. 4, a flowchart of an exemplary process 400 for decoding half resolution split screen broadcasts is shown. Process 400 will be primarily described with respect to receiver 204 described in FIG. 2. Process 400 may also be used as part of the operation of a receiving device, such as receiving device 108 described in FIG. 1. At step 402, a signal, containing the desired bit stream (e.g., bit stream 232) as well as other content, is received from a transmission network. The signal and the content may be provided by a network service provider, such as broadcast affiliate manager 104 described in FIG. 1, and received in an input signal receiver, such as receiver 234. The content, including the bit stream, such as desired bit stream 232, may also be provided from a storage device, such as storage device 237 or other media device, such as digital versatile disc (DVD) or other media.

At step 404, the received input signal is separated into multiple bit streams. As necessary, each of first and second bit streams from the desired bit stream 232 is provided to the appropriate decoder. Step 404 may include a determination as to whether the bit stream includes the merged image. If the bit stream includes the merged image, the bit stream will be decoded in accordance with one or more video compression decoding algorithms, such as H.264/MPEG-4 Part 10, AVC, or other similar compression decoding process. The decoding at step 404 produces a merged image having a half resolution left and right view. At step 406, a similar decoding occurs if one of the separated bit streams includes the full resolution left view image. The decoding at step 406 may use a video compression decoding algorithm similar to that described in step 404.

At step 408, the type of display device used for displaying the video content is determined. In one embodiment, the display device is coupled to the set top box 204 via an audio/video interface, such as audio/video interface 252. The audio/video interface 252 may be an analog signal interface such as red-green-blue (RGB) or may be a digital interface such as high definition multimedia interface (HDMI). The display device may also be integrated with the receiving and processing components in set top 204. The determination at step 408 may be performed automatically through a display device identification process, or may be user selected.

Based on the type of the display determined in step 408, then, at step 410 the appropriate output signal is provided to the display device. In one embodiment, steps 408 and 410 are performed by controller 254 and selector 250. For example, if the controller 254 determines a 3D display device is coupled to the audio/video interface 252, the 3D half resolution output 242 will be sent to the audio/video interface 252 via the selector 250. If the controller 254 determines a 2D display device is coupled to the audio/video interface 252, the 2D full resolution output 248 will be sent to the audio/video interface 252 via the selector 250. Alternatively, steps 408 and 410 may be performed using other elements, such as the audio/video interface 22 or decoders 238 and 244. It is also to be appreciated that the above processing may originate from the signals received at the input signal receiver or from content retrieved from the storage device 237.

Figure 5:
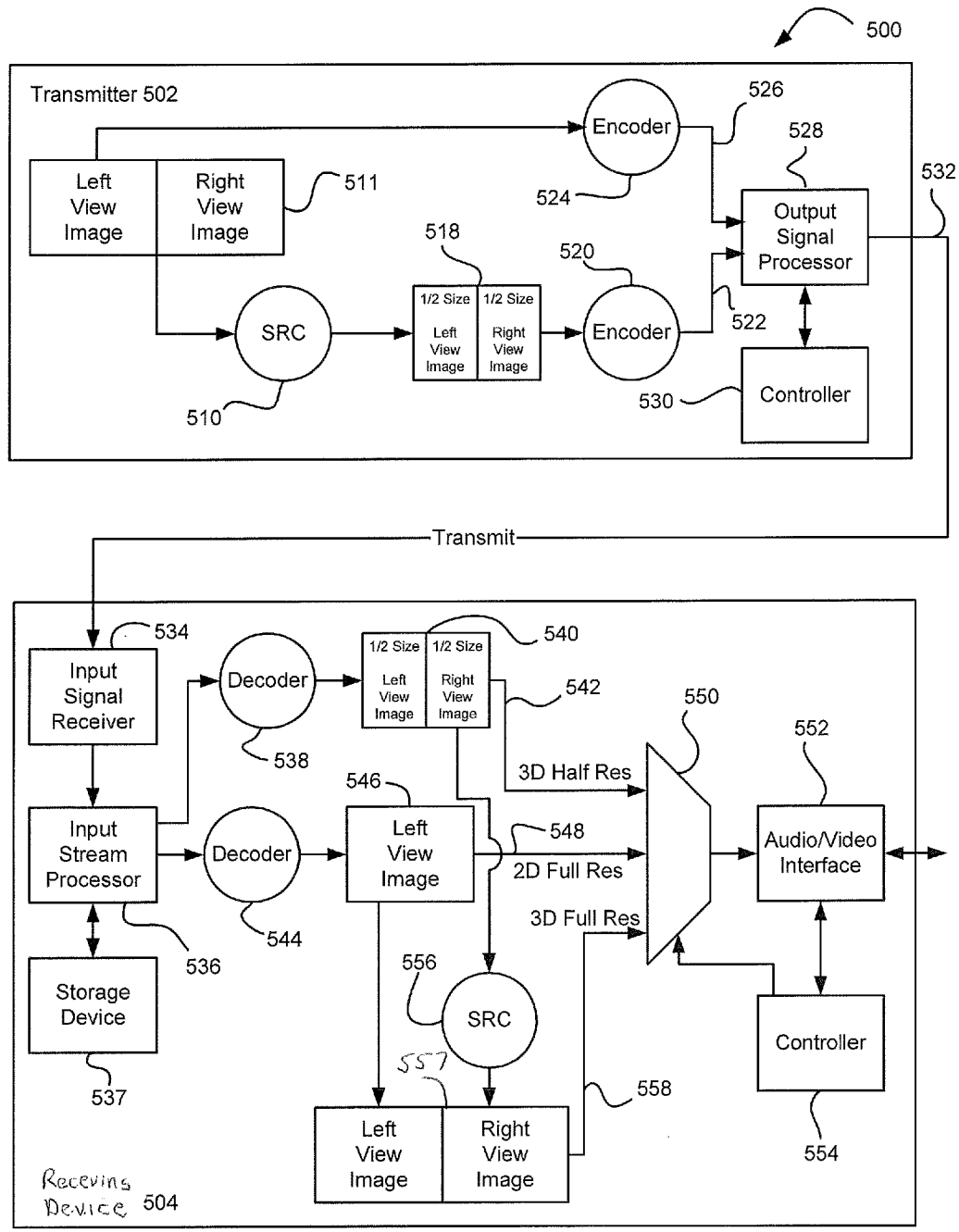
FIG. 5 is a block diagram of an exemplary embodiment of a system for legacy three dimensional (3D) broadcasts and full resolution 3D broadcasts in accordance with the present disclosure.

Turning now to FIG. 5, a block diagram of an embodiment of a system for legacy three dimensional (3D) broadcasts, legacy 2D broadcasts and full resolution 3D broadcasts is shown. System 500 includes a transmitter 502 for encoding and broadcasting video content and a receiving device 504, e.g., a set-top box, gateway, or other network interface device, for receiving the video content, decoding the video content and providing the decoded video content to a display device. Receiving device 504 may also be included in a mobile device, such as a personal digital assistant, tablet, or cellular telephone. Except as described below, both transmitter 502 and receiving device 504 operate and interface with each other in a manner similar to system 200 described in FIG. 2.

Transmitter 502 acquires a full resolution right view image and a full resolution left view image of a stereo image pair. The full resolution right view image and left view image may be provided from a content source or in some other manner as described above. The right view image and left view image are merged into a single image in merging circuit 511 and provided to a sample rate converter 510. The sample rate converter 510 converts the horizontal sample rate of the merged image to one half the original horizontal size.

The output of the sample rate converter 510 provides a converted image 518 to encoder 520. Encoder 520 encodes the image using one or more video compression algorithms, such as those described above. Additionally, the acquired full resolution left view image is provided to encoder 524, and encoded using one or more video compression algorithms as described above. The output of encoder 520 and the output of encoder 524, identified as first bit stream 522 and second bit stream 526 respectively, are provided to output signal processor 528. Output of signal processor 528 operates under the control of controller 530. Controller 530 sets a packet ID, or other stream identification, for each bit stream and the output signal processor 528 merges the first bit stream 522 and second bit stream 526 into a single bit stream 532, along with the packet ID or other stream identification. Output signal processor 528 provides an output signal, including bit stream 532, that is transmitted from transmitter 502 to receiving device 504. Additionally, controller 530 creates a program guide that is also transmitted to the receiving device 504. The program guide may include the packet ID or other information about output stream 532, as well as information about other bit streams transmitted to receiving device 504. The program guide is used to inform the receiving device 504 what bit stream 532, as well as any other bit streams included and transmitted as part of the output signal, contains. The program guide may be transmitted as a separate bit stream or may be appended to output bit stream 532.

The receiving device 504 processes the bit steam 532, and provides a separation of the content based on the program guide. The receiving device 504 may include a storage device, such as a hard drive or optical disk drive, for recording and playing back audio and video content. The processed content is provided to a display device, such as display device 114 described in FIG. 1. The display device may be a conventional 2-D type display or may alternatively be an advanced 3-D display. The receiving device 504 may also be incorporated into other systems including the display device itself. In either case, several components necessary for complete operation of the system are not shown in the interest of conciseness, as they are well known to those skilled in the art.

In the receiving device 504, the received signal, including content such as bit stream 532, is received in an input signal receiver 534. The input signal receiver 534 may be one of several known receiver circuits used for receiving, demodulation, and decoding signals provided over one of the several possible networks including over the air, cable, satellite, Ethernet, fiber and phone line networks. The desired input signal may be selected and retrieved in the input signal receiver 534 based on user input provided through a control interface (not shown). The output signal from the input signal receiver 534 is provided to an input stream processor 536. The input stream processor 536 performs the signal selection and processing, and determines which of the first and second bit streams are to be sent to the proper decoder, either decoder 538 or decoder 544. The input stream processor 536 identifies and distinguishes the first and second bit streams based on the program guide information sent by device 502 and the identification of the packet ID, or other stream identification, for a received bit stream, such as bit stream 532. Additionally, the input stream processor 536 may send the received bit streams, if necessary, to a storage device 537, as described above.

As described above, the input stream processor 536 will separate the bit streams and, if identified or distinguished, provide one of the first and second bit streams to the appropriate decoder, either decider 538 or decoder 544. In one embodiment, if the input stream processor 536 determines that the bit stream includes the merged image bit stream (e.g., bit stream 522), then the merged image bit stream will be sent to decoder 538. Decoder 538 decodes the merged image bit stream using a video compression algorithm in accordance with H.264/MPEG-4 Part 10, AVC (Advanced Video Coding), or other algorithm. Decoder 538 produces a 3D half resolution output image signal 542 that is a merged image 540 having a half resolution left and right view. The 3D half resolution output 542 is provided to selector 550 which is under control of controller 554. The operation of the selector 550 and controller 554 are similar to the selector and controller described above in relation to FIG. 2.

If the input stream processor 536 determines, identifies, or distinguishes that the bit stream including the full resolution left view image (e.g., bit stream 526) is provided as part of the received signal, this bit stream is provided to decoder 544. In decoder 544, the left view image is decoded in accordance with H.264/MPEG-4 Part 10, AVC, or other decoding process to produce a 2D full resolution output signal 548 that is a left view image 546. The 2D full resolution output signal 548 from decoder 544, like the output of decoder 538, is also sent to the selector 550, which is under control of the controller 554.

The half resolution right view portion of the 3D half resolution output signal 542 is also provided to sample rate converter 556. Sample rate converter 556 upconverts the horizontal sample rate of the right view portion of the image to back to full resolution. Alternatively, the entire 3D half resolution output signal 542 may be provided to sample rate converter 556. Sample rated converter 556 may operated to discard the left view portion of the signal before upconverting the right view portion. The upsampled right view image may be a 1080 i horizontal split image or 720 p vertical split image. The upconverted right view image signal is provided along with the 2D full resolution output signal 548 from decoder 544 to the merging circuit 557. Merging circuit 557 combines the upconverted right view image with the full resolution left view image to produce left and right full resolution output signal 558. The full resolution output signal is also provided to selector 550, which is under the control of controller 554.

It is important to note that, based on the upconversion performed in sample rate converter 556 on the right view portion of the 3D half resolution output signal 542, some form of sample rate conversion may also be performed on the 2D full resolution output signal 548. For example, the 2D full resolution output signal 548 may be 1080 i format, while the upconverted right portion signal may be 720 P. In order to match the images, a sample rate conversion of the 2D full resolution output signal 548 from 1080 i to 720 P may be necessary. The sample rate conversion may be performed in decoder 544, or may be performed in a separate sample rate converter, not shown.

Although, an additional sample rate conversion of the left view image portion of 3D half resolution output signal 542 may also be performed along with the right view image portion in sample rate converter 556, the use of the 2D full resolution output signal 548 for the left view image results in a higher visual quality image. The process of sample rate conversion may be produce noticeable artifacts, such as image errors or distortions. By using, the 2D full resolution output signal 548, the viewer may be less aware of the sample rate conversion artifacts because these artifacts may only be present in the right eye view.

Controller 554 determines a type of a display device coupled to the receiving device 504 via an audio/video interface 552. The audio/video interface 552 may be an analog signal interface such as red-green-blue (RGB) or may be a digital interface such as high definition multimedia interface (HDMI). The controller 554 communicates with the audio/video interface 552 and receives information from the audio/video interface 552 as to whether a 2D display device, 3D legacy display device or 3D full resolution display device is connected thereto. Based on the type of the display device, the controller 554 controls the selector 550 to output the appropriate output signal. For example, if the controller 554 determines a legacy 3D display device is coupled to the audio/video interface 552, the 3D half resolution output 542 will be sent to the audio/video interface 552 via the selector 550. If the controller 554 determines a 2D display device is coupled to the audio/video interface 552, the 2D full resolution output 548 will be sent to the audio/video interface 552 via the selector 550. If the controller 554 determines a full resolution 3D display device is coupled to the audio/video interface 552, the 3D full resolution output 558 will be sent to the audio/video interface 552 via the selector 550. It is to be appreciated that the above processing may originate from the signals received at the input signal receiver or from content retrieved from the storage device 537.

Figure 6:
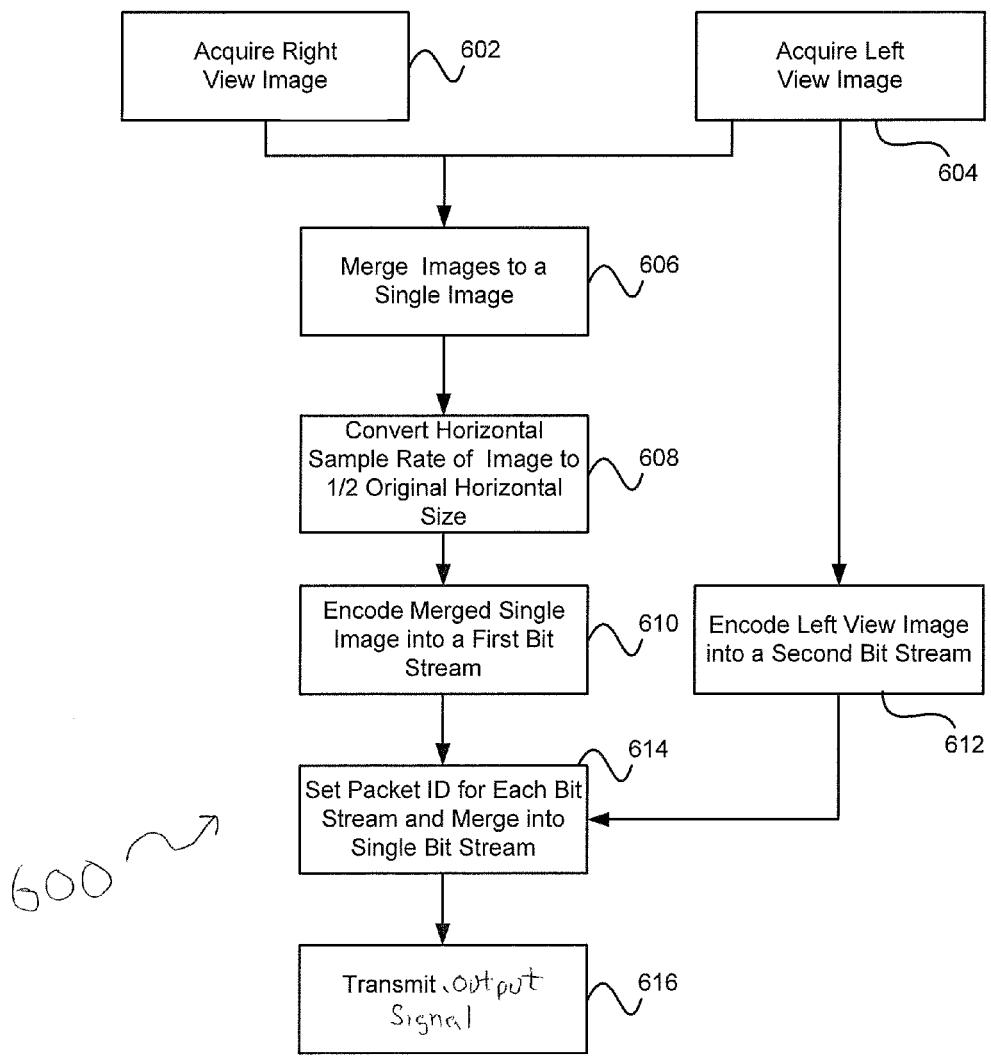
FIG. 6 is a flowchart of an exemplary embodiment of a process for encoding legacy three dimensional (3D) broadcasts and full resolution 3D broadcasts in accordance with the present disclosure.

Turning now to FIG. 6, a flowchart of an exemplary process 600 for encoding legacy 3D broadcasts, legacy 2D broadcasts and full resolution 3D broadcasts is shown. Process 600 will primarily be described with respect to the transmitter 502 described in FIG. 5 but may similarly be described with respect to transmitter 202 described in FIG. 2 or may be included in the equipment found in broadcast affiliate manager 104 described in FIG. 1. At step 602, a full resolution, right view image is acquired. Similarly, at step 604 a full resolution left view image is acquired. The right view and left view image form a stereo image pair and may be provided from a content source, such as content source 102 described in FIG. 1. Additionally one of the two images may be generated by a transmitter device, such as transmitter 502, using a 2D image and 2D-3D processing techniques. At step 606, each of the right view image and left view image are converted by changing the horizontal sample rate of each image to one half the original horizontal size. Next, at step

608, the one half size right view image and one half size left view are merged into a single image. It is important to note that each one half size image typically occupies one half of the full horizontal width of the image signal. Alternatively, each half size image may be interspersed in a pattern across the entire image signal, such as in a checkerboard pattern.

It is important to note that depending on the display format for the originally received image signals at step 502 and step 504, it may be advantageous adjust the sample rate in order to re-format the resultant single image at the highest possible display format. For example, if the original left view image and right view image were in a 720 p format, then the sample rate conversion at step 606 and merging at step 608 should be performed to create a merged single image that is in a 1080 p format. As a result, the highest possible video quality for the merged image signal is maintained and transmitted for use by a receiver, such as receiving device 504.

At step 610, the merged image is then encoded using a video compression encoding algorithm to create a first encoded bit stream. In one embodiment, the merged image may be encoded in accordance with H.264/MPEG-4 Part 10, AVC, or some similar compression algorithm. At step 612, the full resolution left view image from step 604 is encoded using a video compression encoding algorithm, similar to that described in step 610, to create a second encoded bit stream.

Next at step 614, information about the first bit stream and second bit stream is retrieved and processed to form one or segments (e.g., bits, bytes, packets) of program information. Also in step 614, the first bit stream and second bit stream are merged to form a single signal or bit stream and the information for the first bit stream and second bit stream is appended to the single bit stream. In one embodiment the information is appended as a program identification (PID). The PID for the single bit stream may also be combined with PIDs from other bit streams to form a separate program guide bit stream. Finally, at step 616, an output signal containing the single bit stream is transmitted. The output signal may be transmitted as a transmission signal over a delivery network, such as delivery network 106 described in FIG. 1. The transmission step 616 may also include additional signal processing necessary to transmit the signal, as described earlier. The output signal may contain other bit streams as well as additional information, such as a program guide stream. It is important to note that the program guide information may be appended to the single bit stream instead of being created as a separate bit stream.

Figure 7:
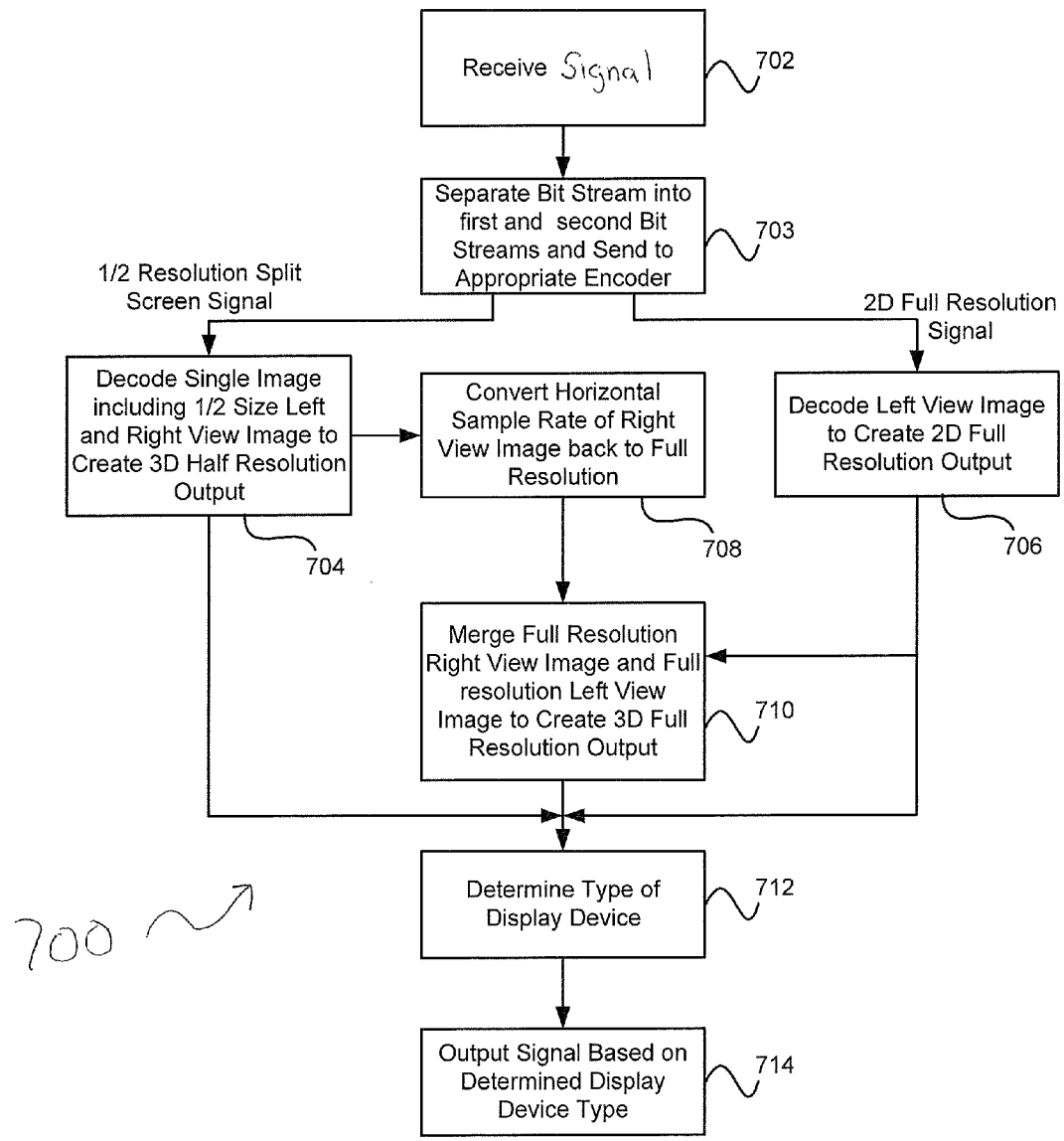
FIG. 7 is a flowchart of an exemplary embodiment of a process for decoding legacy three dimensional (3D) broadcasts and full resolution 3D broadcasts in accordance with the present disclosure.

Turning now to FIG. 7, a flowchart of an exemplary process 700 for decoding legacy 3D broadcasts, legacy 2D broadcasts and full resolution 3D broadcasts is shown. Process 700 will be primarily described with respect to receiving device 504 described in FIG. 5 but may similarly be described with respect to receiver 202 described in FIG. 2. Process 700 may also be used as part of the operation of a receiving device, such as receiving device 108 described in FIG. 1. At step 702, a signal, containing desired video content in a bit stream, as well as other content, is received from a transmission network. The signal and the content may be provided by a network service provider, such as broadcast affiliate manager 104 described in FIG. 1, and received in an input signal receiver, such as receiver 534. The content, including the bit stream, may also be provided from a storage device, such as storage device 237 or other media device, such as digital versatile disc (DVD) or other media.

At step 703, the received input signal is separated into multiple bit streams. The separation step 703 includes identification of the individual bit streams, such as a determination and identification of a first bit stream as a merged half resolution 3D video image and identifying a second bit stream as a full resolution 2D image as a left view image. The separation step 703 also provides each of the identified first and second bit streams from the desired bit stream to the appropriate decoder. Based on the determination and identification in step 703, at step 704, the first bit stream, a half resolution 3D video signal, is decoded in accordance with one or more video compression decoding algorithms, such as H.264/MPEG-4 Part 10, AVC, or other similar compression decoding process. The half resolution 3D signal may be in several formats, including a split screen 3D video signal or a checkerboard video signal. The decoding at step 704 produces a merged image having a half resolution left and right view. At step 706, a similar decoding occurs for the second bit stream, a 2D full resolution image signal. The decoding at step 706 may use a video compression decoding algorithm similar to that described in step 704.

At step 708, the right view portion of the half resolution merged image signal is sample rate converted to produce a full size and full resolution right view image signal. Although the right view image signal is a full resolution signal, it is understood that the sample rate conversion will introduce image artifacts to the full resolution right view image. At step 710, the decoded and converted full resolution right view image generated in step 708 and the decoded full resolution left view image are merged into a single full resolution 3D output signal. It is important to note that the single full resolution 3D output signal from step 710, the half resolution 3D output signal from step 704, and the full resolution 2D (left view) output signal from step 706 are available and provided for display.

Next, at step 712, the type of display device used for displaying one of the output signals generated above is determined. In one embodiment, the display device is coupled to the receiving device 504 via an audio/video interface, such as audio/video interface 552. The determination at step 712 may be performed automatically through a display device identification process, or may be user selected. In one embodiment, if a 2D display device is used, the full resolution 2D output signal is selected. In a 3D display device is used, either the half resolution 3D resolution output signal or the full resolution 3D output signal is selected. The choice of a half resolution or a full resolution 3D output signal may be made by a user through a user interface selection. In another embodiment, the full resolution 3D output signal is always selected if it available, as determined in step 703.

Based on the type of the display determined in step 712, then, at step 714 the selected output signal, either a 2D full resolution left view image signal, a half resolution 3D left view and right view image signal, or a full resolution 3D left view and right view image signal, is provided to the display device.

It is important to note that although system 500, process 600, and process 700 are described as operating on a half resolution 3D left view and right view image signal, other partial, or reduced, resolution 3D signals may also be used. For instance, 3D signal including a reduced resolution (other than half) left view image and a reduced resolution (other than half) right view image may be used, with the resolution of the left view image being different from the resolution of the right view image.

Certain steps in process 700 may be modified or omitted based on a specific implementation. For instance, the display determination step 712 may be performed prior to the decoding steps 704 and 706. Based on the type of display device used, one or the other of decoding steps may be omitted or disabled.

A system and method for legacy three dimensional (3D) broadcasts, legacy 2D broadcasts and full resolution 3D broadcasts has been described. The receiving device 504 will decode the legacy 2D broadcast for the left eye view and the legacy 3D split screen broadcast. The full resolution right view is created by scaling the right half of legacy 3D split screen broadcast. In this manner, full resolution 3D may be provided with no new compression techniques required.

As described above, the embodiments in FIGS. 2-7 relate to receiving and processing the bit streams used for 3D broadcasts includes receiving a data signal that includes two different bit streams merged into the data signal. The first video signal represents a two-dimensional image at a first video resolution and the second video signal represents a three-dimensional image at a second resolution. The embodiments also include decoding the first video signal if an output display type is a two-dimensional display type, decoding the second video signal if the output display type is a first three-dimensional display type, and decoding the first video signal and second video signal simultaneously if the output display type is a second three-dimensional display type.

The embodiments in FIGS. 2-7 also relate to processing a received signal to provide a 3D video output. The embodiments include receiving a signal, the signal including a first video signal representing a two-dimensional image at a first video resolution and a second video signal representing a three-dimensional image at a second resolution, determining a type of display device for viewing video content, decoding the first video signal, decoding the second video signal, and providing an output signal to the display device, the output signal including a combination of the first decoded video signal and a portion of the second decoded video signal if the type of display device is a three dimensional display device.

In another embodiment, a system and method for user adjustable disparity mapping in a receiving device is provided. The system and method uses an H.264 encoder in the receiving device to assist in generating a dense disparity mapping of a received and decoded pair of stereo images, i.e., a right view image and a left view image. The two images are aligned consecutively in time and passed through the encoder to generate encoding information such as motion vectors. The resulting motion information is used to generate a disparity map that can be used as a user control for adjusting the image depth in the stereo image set. Such a system is useful if the signal transmission includes sending stereoscopic images but omits transmission of a depth map.

Figure 8:
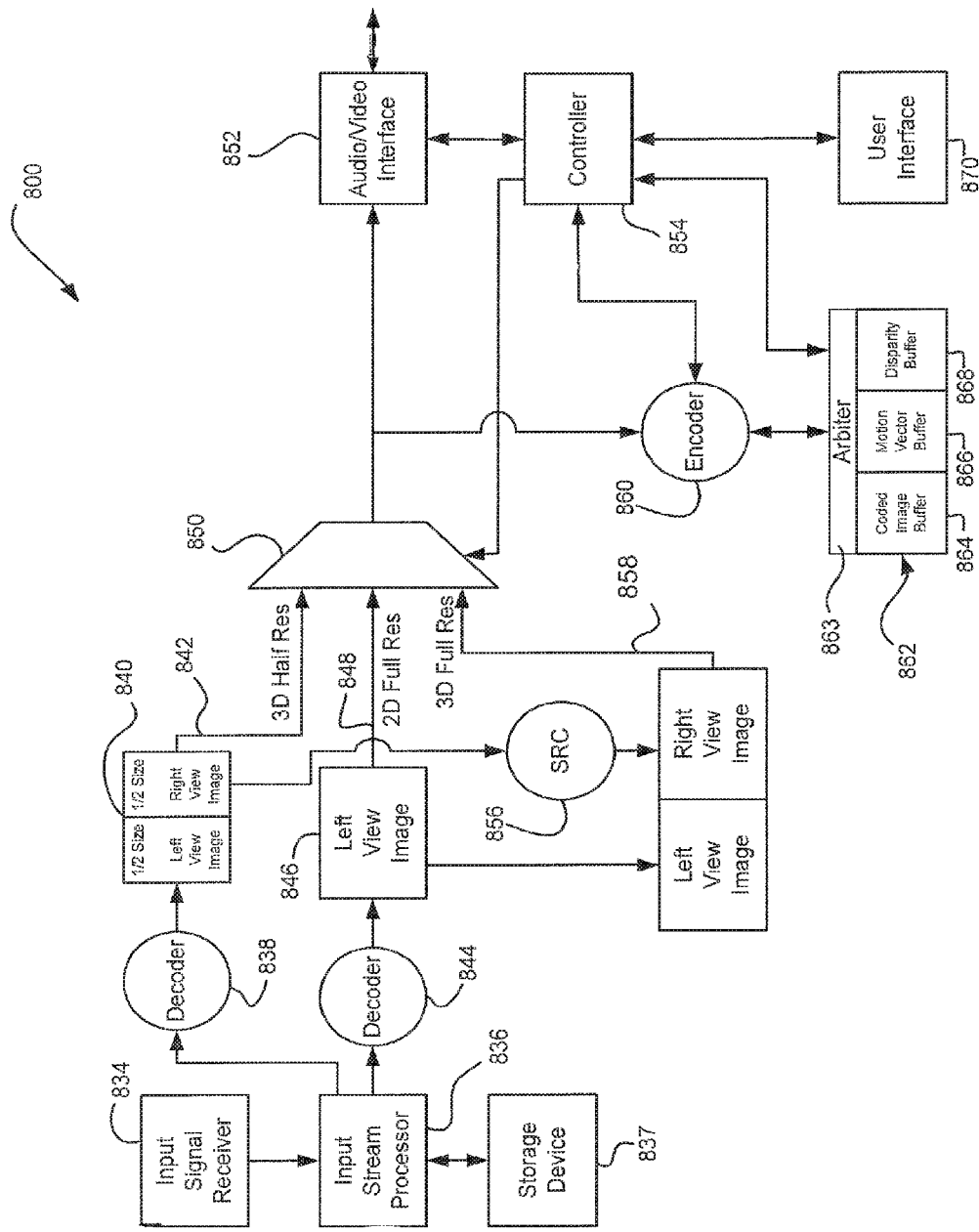
FIG. 8 is an exemplary embodiment of a receiving device for generating a dense disparity map in accordance with the present disclosure.

Turning now to FIG. 8, an exemplary embodiment of a receiving device 800 for generating a dense disparity map is shown. It is to be appreciated that, except as described below, elements similar to those described above in relation to FIGS. 2 and 5 will not be described in detail. For example, input signal receiver 834, input stream processor 836, storage device 837, decoders 838 and 844 and sample rate converter 856 perform substantially as described above to provide the 3D half resolution output 842, the 2D full resolution output 848 and 3D full resolution output 858 to the selector 850.

Receiving device 800 further includes an encoder 860 coupled to the output of selector 850. Encoder 860 is also coupled to memory 862. Controller 854 is also coupled to encoder 860 as well as memory 862. A user interface 870 is coupled to controller 854.

In operation, when selector 850 outputs either a 3D half resolution signal 842 or 3D full resolution signal 858, encoder 860 receives the decoded pair of left view and right view images and stores the images in the coded image buffer 864, shown as portion of memory 862. The encoder 860 sets the left view image to be the reference image, also known as an instantaneous decode refresh (IDR) frame. Encoder 860 apportions the reference image to select 4 pixel by 4 pixel (4×4) motion blocks and use P-frame unidirectional prediction to generate a motion vector for each 4×4 sub-block of the right view image. It is important to note that the use of a 4 pixel by 4 pixel block is based on standard practice. However, other block sizes may be used with corresponding level of differences in results. The motion vector for each 4×4 block is used to encode the right view image which is stored in the coded image buffer 864. Since the desired output of the encode process is the motion vectors rather than the actual coded image the motion vectors are extracted from the coded image signal and stored in a motion vector buffer 866, also shown as part of memory 862. The information stored in coded image buffer 864 following creation and storage of the motion vectors in motion vector buffer 866. As necessary, encoder 860 steps through the remaining portions of the image signal to encode the next image pair until all images pairs are processed.

It is to be appreciated that coded image buffer 864 and motion buffer 866 may reside on a single, shared memory device 862 or may be separate individual buffers. In the embodiment shown in FIG. 8 with a single shared memory device 862, an arbiter 863 is included. Arbiter 863 arbitrates, or manages, access to the shared memory elements of memory 862. Although FIG. 8 only shows two clients (i.e., encoder 860 and controller 854) accessing memory device 862, in most practical systems there are several independent clients all trying to access the same memory device, such as memory device 862. In other embodiments, memory access may be individually controlled or controlled by a controller similar to control 854. It is the function of the arbiter 863 to make sure each client gets access at an assigned level of priority and with sufficient bandwidth and low enough latency to accomplish the task assigned to each of the functional units.

The signal stored in motion vector buffer 866 is filtered to remove any vertical component of any generated motion vector. The filtered result is used as an indication, with picture level granularity of four pixel by four pixel image regions, of the horizontal disparity between the left view and right view pictures. This filtered result, represented as a numerical entry, or as some other quantifiable difference indicator, is stored in disparity buffer 868, also shown as part of memory device 862. It is to be appreciated that although the above functions are illustrated and described as being performed by encoder 860, one or more of the functions could also be implemented by controller 854 or by fixed function hardware or a combination of hardware and software.

The array of horizontal disparity values stored in disparity buffer 868 may be further filtered (e.g., spatially) by taking into account the differences in value between horizontally adjacent disparity values. For example, consider a 4×4 picture block B with a 4×4 picture block A to its immediate left and a 4×4 picture block C to its immediate right. If the disparity between left and right picture views at block A is 6, and if the disparity between left and right picture views at block B is 4, and if the disparity between left and right picture views at block C is 2, then a gradual shift is indicated in the disparity as a function of the progression from the left spatial position in the image pair to the right spatial position in the image pair. Assuming that this shift is smooth, the controller 854 can interpolate across 4×4 picture block B assigning the left-most pixels with a disparity between 4 and 6 and the right most pixels with a disparity between 4 and 2. Although this example only looks at, or incorporated and processes, one 4×4 region to the left and right, other filters could be employed that incorporate further regions in either direction. In addition, the same filter principles may be applied in the vertical direction to create and process a disparity map with pixel level granularity.

As needed, encoder 860, or alternatively the controller 854, generates an occlusion map. Sharp changes in disparity value between horizontally or vertically adjacent 4×4 blocks provide an indication of the existence of edges between near field objects and far field objects in the stereo image pair. On these edges, it is typically the case that the left eye is able to see part of the near field object that is blocked from view for the right eye; and likewise the right eye will have a view of part of the object which is blocked for the left eye. These areas of visual mutual exclusivity of view between the left and right eyes create occlusions which can be detected while processing the disparity vectors and signaled to a later image processing step. In later image processing steps, it may be advantageous to apply a different processing of these occluded regions versus the processing applied to the overall picture. Together, the pixel level disparity map described above and the occlusion map form a dense disparity map. It is to be appreciated that there are several techniques known in the art to generate a dense disparity map from the pixel level disparity map and the occlusion map.

A dense disparity map of a stereo video signal reveals the convergence depth of every pixel pair within the stereo image pair. When this information is known and identified, the receiving device 800 is able to determine how and where in the picture graphics overlays can be presented in order to avoid unpleasant depth conflicts between video and graphics. In addition, the dense disparity map can be used in order to allow receiving device 800 to modify the perceived 3D depth of a stereo image by applying a disparity and occlusion aware scaling algorithm to one or both pictures of the stereo pair. This enables receiving device 800 to implement features such as user controlled 3D depth.

Depth scaling using disparity and occlusion aware scaling permits easy modification of the range of perceived depth in the stereo image pair. For example, the range of depth in an image may be identified as the perceived distance between the furthest object behind the plane of the image rendering surface and the object furthest in front of the plane of the image rendering surface. This depth range represents a visual stereoscopic 'volume'. In one embodiment, the user may control this visual stereoscopic 'volume' with a simple user control, such as an up/down control via user interface 870. The control may be used to increase or decrease the perceived range of depth in the stereo image. User interface 870 may be any known user interface including, but not limited to, a remote control device, a plurality of buttons disposed on the receiving device 804, a user preference screen generated by the receiving device 804 and displayed on a display device, etc. Therefore, by generating a dense disparity map in the receiving device 804, user controlled depth scaling can be achieved.

Figure 9:
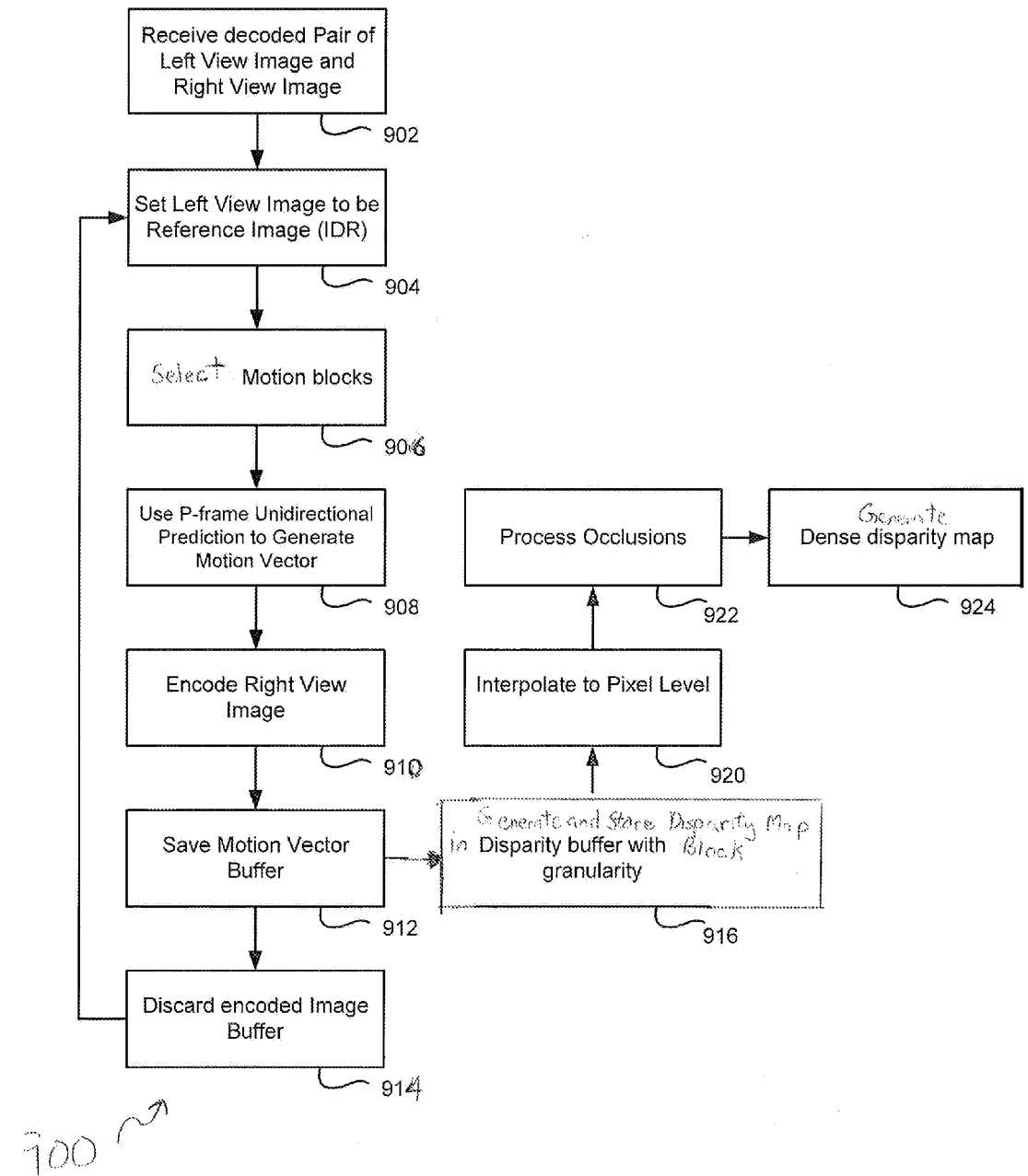
FIG. 9 is flowchart of an exemplary embodiment of a process for generating a dense disparity map in accordance with the present disclosure.

Turning to FIG. 9, a flowchart of an exemplary process 900 for generating the dense disparity map is shown. The steps of process 900 may be performed in receiving device 800. The steps of process 900 may similarly be performed in other receivers or set top box devices, such as receiver 204 described in FIG. 2 or receiving device 504 described in FIG. 5. At step 902, the decoded pair of left view and right view images, as part of a signal, are received. The decoded pair of left and right view images are provided by a selector and may be a half resolution 3D image signal or a full resolution 3D image signal. Further, the full resolution 3D image signal may include a sample rate converted portion of the half resolution 3D image signal as described above. Step 902 may also include storing the images in memory, such as the coded image buffer 864.

At step 904, the left view image is set to be the reference image or IDR. Although either image may be set as the reference image, it is advantageous to use the left view image because, as described above, the left view image is a full resolution image, thus reducing or eliminating the presence of image artifacts in the reference image. Next, at step 906, the size and apportioning of motion blocks is selected. As described above, the motion block size may be 4×4 pixels, however, other block sizes are possible. At step 908, motion vectors are generated using P-frame unidirectional prediction for each of the corresponding sub-blocks of the right view image with reference to the left view image. Next, at step 910, the generated motion vectors for the sub-blocks are used to encode the right view image. At step 912, the final set of motion vectors from steps 908 and 910 is stored in a memory, such as motion vector buffer 866. In process 900 as described in this manner, the left and right view images are processed as if they exist temporally rather than spatially. In other words, although the left and right images are intended to be viewed simultaneously in time, the motion processing is performed as if the left and right view images occurred consecutively in time.

At step 914, the contents of the memory storing the encoded images (e.g., coded image buffer 864) are discarded, or erased, since the desired output of the encode process steps described above is the motion vectors rather than the actual coded image the motion vectors. From step 914, process 900 returns to step 904 to encode any remaining image pairs or portions until all images pairs are encoded and motion vectors processed.

Next, at step 916, a granular disparity map is generated and stored by filtering sets of motion vectors. The granular disparity map is an indication, with picture level granularity of equal to sub-block size selected at step 906, of the horizontal disparity between the left view and right view pictures. In one embodiment, the motion vectors for a set of three consecutively located motion sub-blocks are compared and quantified to determine adjacent disparity values. The array of horizontal disparity values may then be further filtered, or interpolated, at step 920, by taking into account the differences in value between horizontally adjacent disparity values and further interpolated vertically in a manner similar to that described above to determine a pixel level disparity map.

Next, at step 922, an occlusion map is generated. As discussed above, any changes in disparity value between horizontally or vertically adjacent blocks may be an indication of edges between near field and far field objects in the stereo image pair. The occlusion map may be generated at step 922 using either the original motion vectors stored at step 912, or the disparity maps generated at steps 916 and/or 920. In the latter, the occlusion map may be generated from the motion vectors by filtering or interpolating the motion vectors in a manner to reinforce the presence of edges.

Finally, at step 924 the pixel level disparity map generated at step 920 and the occlusion map generated at step 922 are combined to form a dense disparity map. It is to be appreciated that there are several techniques known in the art to generate a dense disparity map from the pixel level disparity map and the occlusion map. As described above, the dense disparity may be used to permit such features as a user adjustable depth range in the 3D image.

The embodiments described in FIGS. 8 and 9 relate to generating a dense disparity map in a receiving device. The embodiments include receiving a signal that includes a desired bit stream. The desired bit stream may further include, and be separated into one or more bit streams representing a 2D full resolution image signal as a single left eye or right eye image and a 3D partial or reduced (e.g., half) resolution image signal containing a reduced resolution left eye image and a reduced resolution right eye image. The bit streams are decoded in order to produce a signal having a left eye image and a right eye image, either at full or reduced resolution. The embodiments further describe encoding the left eye image as a reference image, predictively coding the right eye image using the coded left eye image as the reference image, capturing motion indicators generated during encoding of the right eye image, and generating a dense disparity map between the left eye image and right eye image using the motion indicators.

Although embodiments which incorporate the teachings of the present disclosure have been shown and described in detail herein, those skilled in the art can readily devise many other varied embodiments that still incorporate these teachings. Having described preferred embodiments of systems and low bandwidth methods for encoding and broadcasting full resolution 2D video, full resolution 3D video and half resolution 3D video (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method comprising:
   receiving a signal comprising a three dimensional image signal representing a left eye image portion and a right eye image portion;
   encoding a frame in the left eye image portion as a reference image using a two dimensional encoding process;
   apportioning motion blocks in the left eye image portion and right eye image portion, the motion blocks being a fixed number of pixels;
   predictively coding, in the two dimensional encoding process, a frame in the right eye image portion using the frame in the coded left eye image portion as the reference image, the predictive coding using unidirectional prediction between the frame in the right eye image portion and the frame in the left eye image portion as if the frame in the right eye image portion and the frame in the left eye portion occurred consecutively even though the frame in the right eye image portion and the frame in the left eye image are intended to be viewed simultaneously;
   capturing motion indicators generated from the two dimensional encoding process during the predictive coding of the frame in the right eye image portion; and
   generating a granular disparity map between the frame in the left eye image portion and the frame in the right eye image portion by filtering the motion indicators, the granular disparity map including and indication of disparity with picture level granularity equal to a size of the apportioned motion blocks;
   interpolating the granular disparity map to a pixel level disparity map by determining horizontally adjacent disparity values in at least three consecutively located motion blocks; and
   generating a dense disparity map by combining the pixel level disparity map and an occlusion map, the occlusion map generated from the pixel disparity map.

2. The method of claim 1, wherein the generating a granular disparity map includes filtering motion indicators to remove vertical components.

3. The method of claim 1, wherein the signal is an encoded signal, the encoded signal is encoded to include at least one of a full resolution two-dimensional image, a reduced resolution three-dimensional stereoscopic image, and a full resolution three-dimensional stereoscopic image.

4. The method of claim 3, wherein the encoded signal is encoded using a three-dimensional encoding process.

5. The method of claim 4, further comprising decoding the left eye image portion and the right eye image portion in the encoded signal.

6. The method of claim 1, wherein method is performed in a set-top box.

7. The method of claim 1, wherein the two dimensional encoding process is an H.264 encoding process.

8. The method of claim 1, wherein the motion indicators include at least one motion vector.

9. The method of claim 1, wherein the fixed number of pixels in each apportioned motion block is a 4×4 block of pixels.

10. The method of claim 9, wherein the interpolating includes processing the motion indicators to generate motion indications for individual pixels.

11. An apparatus comprising:
    a receiver that receives a signal comprising a three dimensional image signal representing a left eye image portion and a right eye image portion;
    an encoder, coupled to the receiver, that encodes a frame in the left eye image portion as a reference image using a two dimensional encoding process, the encoder predictively codes, using the two dimensional encoding process, a frame in the right eye image portion using the frame in the coded left eye image portion as the reference image, the predictive coding using unidirectional prediction between the frame in the right eye image portion and the frame in the left eye image portion as if the frame in the right eye image portion and the frame in the left eye image portion occurred consecutively even though the frame in the right eye image portion and the frame in the left eye image portion are intended to be viewed simultaneously and the encoder captures motion indicators generated from the two dimensional encoding process during the predictive coding of the frame in the right eye image portion; and
    a controller, coupled to the encoder, that apportions motion blocks in the left eye image portion and right eye image portion, the motion blocks being a fixed number of pixels and generates a granular disparity map between the frame in the left eye image portion and the frame in the right eye image portion by filtering the motion indicators, the granular disparity map including and indication of disparity with picture level granularity equal to a size of the apportioned motion blocks, the controller further interpolates the granular disparity map to a pixel level disparity map by determining horizontally adjacent disparity values in at least three consecutively located motion blocks and generates a dense disparity map by combining the pixel level disparity map and an occlusion map, the occlusion map generated from the pixel level disparity map.

12. The apparatus of claim 11, wherein the controller generates the granular disparity map by filtering the motion indicators to remove vertical components.

13. The apparatus of claim 11, wherein the signal is an encoded signal, the encoded signal is encoded to include at least one of a full resolution two-dimensional image, a reduced resolution three-dimensional stereoscopic image, and a full resolution three-dimensional stereoscopic image.

14. The apparatus of claim 13, wherein the encoded signal is encoded using a three dimensional encoding process.

15. The apparatus of claim 14, further comprising a decoder that decodes the left eye image portion and the right eye image portion in the encoded signal.

16. The apparatus of claim 15, wherein the two dimensional encoding process is an H. 264 encoding process.

17. The apparatus of claim 11, wherein the motion indicators include at least one motion vector.

18. The apparatus of claim 11, wherein the fixed number of pixels in each apportioned motion is a 4×4 block of pixels.

19. The apparatus of claim 18, wherein the controller interpolates motion indications for individual pixels.

20. An apparatus comprising:
means for receiving a signal comprising a three dimensional signal representing a left eye image portion and a right eye image portion;
means for encoding a frame in the left eye image portion as a reference image using a two dimensional encoding process;
means for apportioning motion blocks in the left eye image portion and right eye image portion, the motion blocks being a fixed number of pixels;
means for predictively coding, in the two dimensional encoding process, a frame in the right eye image portion using the frame in the coded left eye image portion as the reference image, the means for predictive coding using unidirectional prediction between the frame in the right eye image portion and the frame in the left eye image portion as if the frame in the right eye image portion and the frame in the left eye portion occurred consecutively even though the frame in the right eye image portion and the frame in the left eye image portion are intended to be viewed simultaneously;
means for capturing motion indicators generated from the two dimensional encoding process during the predictive coding of the frame in the right eye image portion; and
means for generating a granular disparity map between the frame in the left eye image portion and the frame in the right eye image portion by filtering the motion indicators, the granular disparity map including an indication of disparity with picture level granularity equal to a size of the apportioned motion blocks,
means for interpolating the granular disparity map to a pixel level disparity map by determining horizontally adjacent disparity values in at least three consecutively located motion blocks; and
means for generating a dense disparity map by combining the pixel level disparity map and an occlusion map, the occlusion map generated from the pixel level disparity map.

21. The apparatus of claim 20, wherein the generating a granular disparity map includes filtering motion indicators to remove vertical components.

22. The method of claim 20, wherein the signal is an encoded signal, the encoded signal is encoded to include at least one of a full resolution two-dimensional image, a reduced resolution three-dimensional stereoscopic image, and a full resolution three-dimensional stereoscopic image.

23. The method of claim 22, wherein the encoded signal is encoded using a three-dimensional encoding process.

24. The method of claim 23, further comprising decoding the left eye image portion and the right eye image portion in the encoded signal.

25. The apparatus of claim 20, wherein the two dimensional encoding process is an H.264 encoding process.

26. The apparatus of claim 20, wherein the motion indicators include at least one motion vector.

27. The apparatus of claim 20, wherein the fixed number of pixels in each motion block is a 4×4 block of pixels.

28. The apparatus of claim 27, wherein the means for interpolating includes means for processing the motion indicators to generate motion indications for individual pixels.

* * * * *